Jan. 29, 1957 F. CHWIRUT ET AL 2,779,298
MACHINE FOR MOLDING DOUGH RINGS
Filed June 24, 1955 4 Sheets-Sheet 1
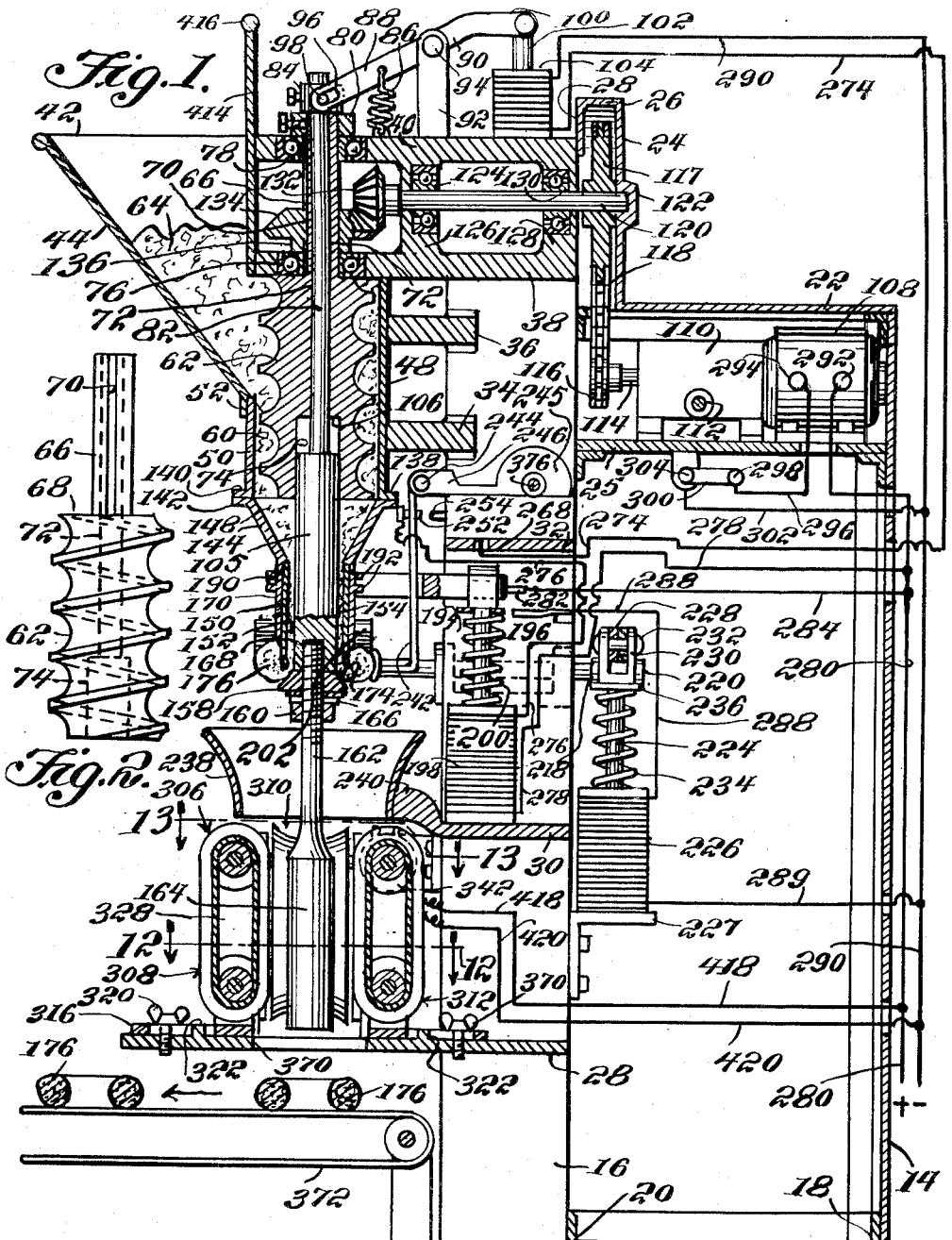
INVENTORS.
Frank Chwirut,
Morris Greenblatt,
BY
McMorrow, Berman & Davidson
ATTORNEYS

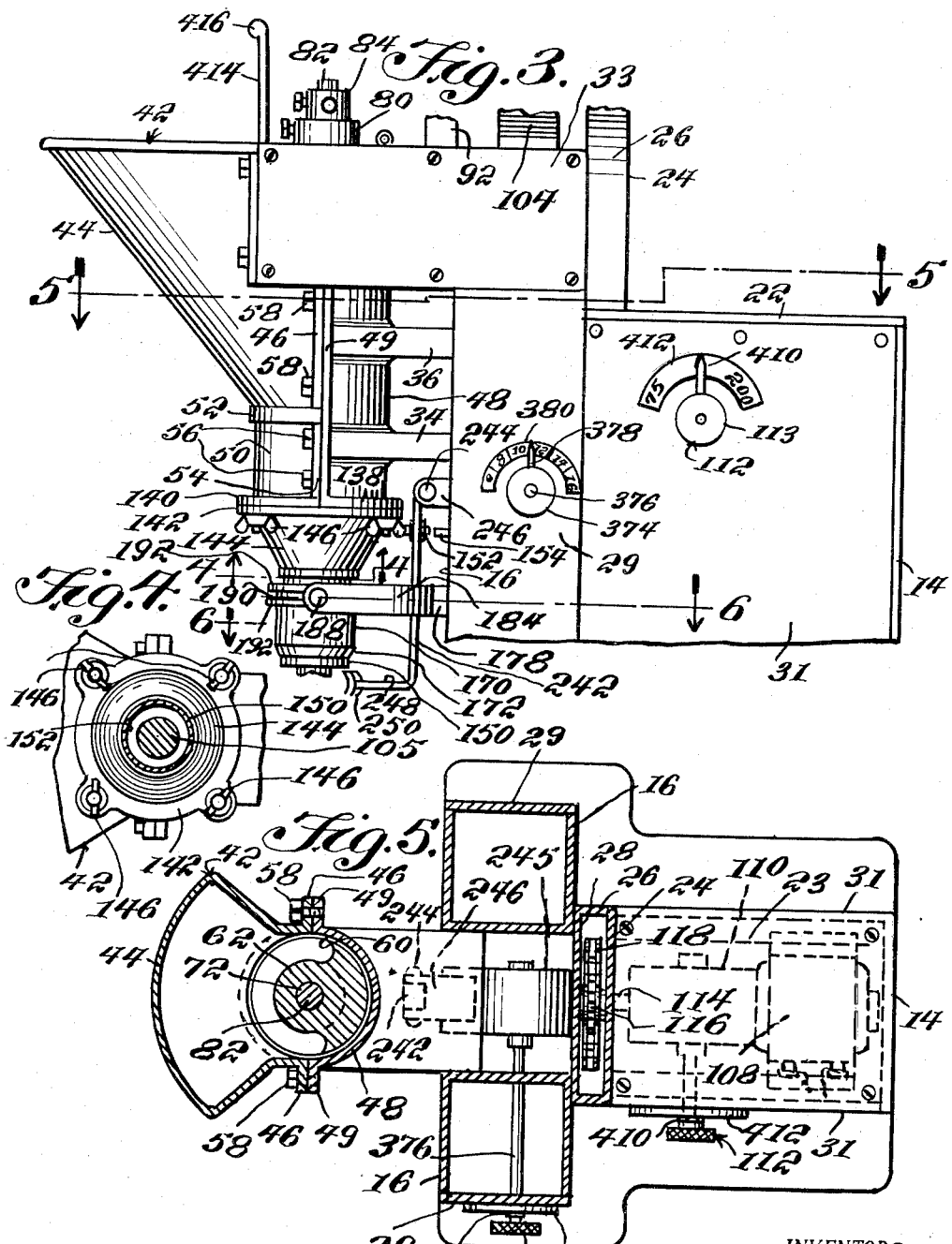

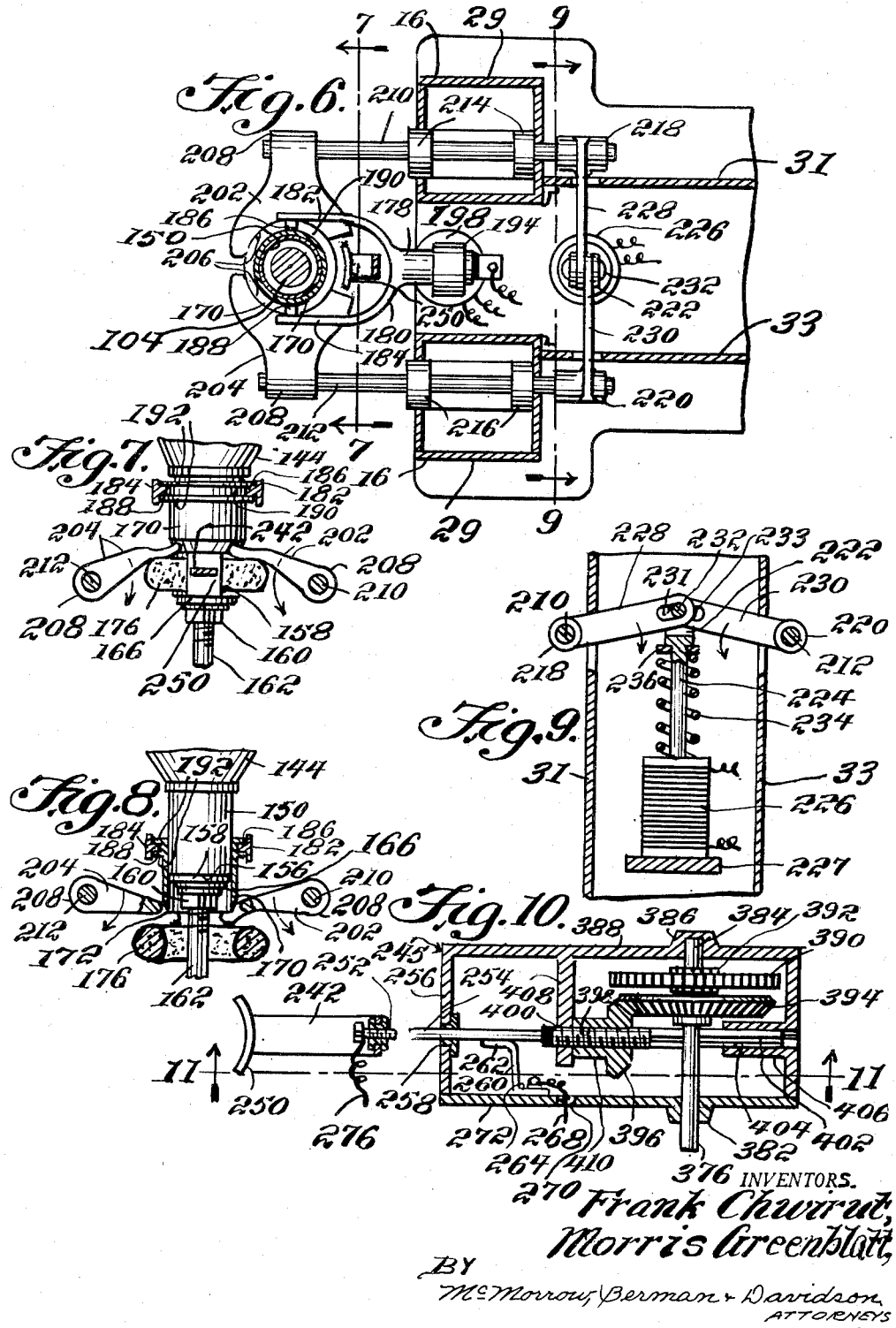

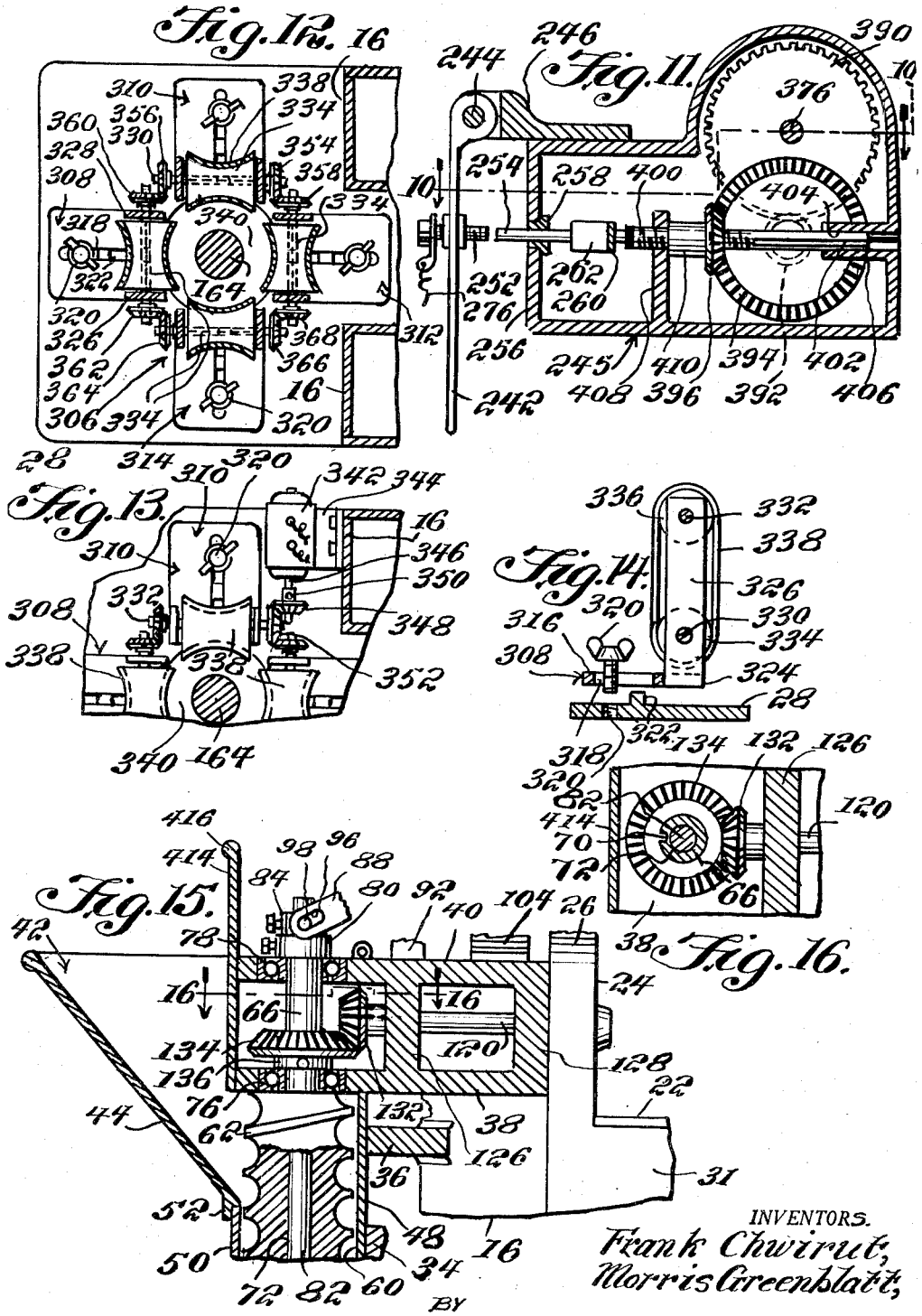

United States Patent Office 2,779,298
Patented Jan. 29, 1957

2,779,298

MACHINE FOR MOLDING DOUGH RINGS

Frank Chwirut, Miami, and Morris Greenblatt,
Miami Beach, Fla.

Application June 24, 1955, Serial No. 517,722

2 Claims. (Cl. 107—14)

This invention relates to dough forming machines, and more particularly to a machine for automatically molding dough rings of the type commonly known as "bagels."

At the present time, bakers roll the dough for making "bagels" by hand, or by crudely home-made devices which are slow and afford tiresome labor. Therefore, it is the primary object of this invention to provide a machine for automatically forming and producing the dough rings which will considerably increase the speed at which the dough rings can be produced.

Another object of this invention is to provide a machine for making dough rings which will afford a sanitary means of handling the dough and exclude contact of the dough by the hands of the operator.

Yet another object of this invention is to provide a machine for molding dough rings which can be regulated as to the speed with which the dough rings are to be formed and produced by the machine, and also, in which the size of the dough rings to be produced can be selectively controlled.

Another and still further object of this invention is to provide a machine for forming and producing dough rings which by eliminating exposed gears and chains will increase the safety with which the machine can be operated.

A still further object is to provide a machine for molding dough rings in which the dough is permitted to travel vertically under the influence of gravity from the storage means to the endless conveyor belt carrying the completed dough rings away from the machine.

Essentially, this machine contemplates dough holding and storing means, means mounted in the holding means for forcing the dough therethrough, molding and extruding means carried by the holding means to receive the dough forced from the holding means to form the dough into a tube, cutting means mounted adjacent the discharge of the molding and extruding means to cut the tube of dough into rings, means mounted adjacent the cutting means for moving the dough rings away from the molding and extruding means, and means mounted adjacent to and in spaced relation from the cutting means and dough ring moving means to receive the cut rings moved away from the extruding means and rolling and smoothing the dough rings so received.

Other objects and advantages will become apparent from a consideration of the following detailed description, forming the specification, taken in conjunction with the accompanying drawings, wherein:

Figure 1 is a vertical cross sectional view through the dough ring forming machine embodying this invention;

Figure 2 is a front elevational view of the worm auger or dough moving means;

Figure 3 is an enlarged side elevational view of the upper portion of the machine;

Figure 4 is a transverse cross sectional view taken along line 4—4 of Figure 3, on a somewhat enlarged scale, and looking in the direction of the arrows;

Figure 5 is a transverse cross sectional view taken substantially along line 5—5 of Figure 3 and looking in the direction of the arrows;

Figure 6 is a cross sectional view taken substantially along line 6—6 of Figure 3 and looking in the direction of the arrows;

Figure 7 is a cross sectional view taken along line 7—7 of Figure 6 and looking in the direction of the arrows;

Figure 8 is a sectional view similar to Figure 7 but showing the dough ring moving arms in a different position after these arms have been caused to operate;

Figure 9 is a cross sectional view taken substantially along line 9—9 of Figure 6 and looking in the direction of the arrows;

Figure 10 is an enlarged horizontal, cross sectional view through the means whereby the size of the dough rings to be formed may be selectively set;

Figure 11 is a cross sectional view taken substantially along line 11—11 of Figure 10 and looking in the direction of the arrows with the dough ring contacting lever shown fragmentarily;

Figure 12 is a cross sectional view taken substantially along the line 12—12 of Figure 1 and looking in the direction of the arrows;

Figure 13 is a fragmentary, cross sectional view of the means for rolling and smoothing the dough rings as taken substantially along line 13—13 of Figure 1, and looking in the direction of the arrows;

Figure 14 is an exploded side elevational view of one of the rolling and smoothing members, shown partially in section;

Figure 15 is a sectional view of the upper portion of the machine showing the hopper, auger, auger drive, etc., shown fragmentarily with parts thereof in elevation; and Figure 16 is a cross sectional view taken substantially along line 16—16 of Figure 15 and looking in the direction of the arrows.

With continued reference to the drawings, there is shown a machine for molding and producing dough rings commonly known as "bagels," which machine includes a rigid support in the form of a frame having a base 10 adapted to rest upon a supporting surface, such as a floor 12. Parallel standards or frame support members 14 and 16 extend vertically upwardly from the base, adjacent opposite ends thereof in perpendicular relation thereto and spaced from each other. Transversely extending, reinforcing angles 18 and 20 rest on the upper surface of the base 10 and contact the adjacent sides of the standards 14 and 16.

At the upper end of the standard 14 there is provided a perpendicularly extending cover 22 extending toward the other standard 16, the cover 22 extending vertically upwardly at its end remote from the end connected to the standard 14 to form a side frame member 24 which terminates in a short perpendicularly extending top wall 26 and a return side wall 28 extending perpendicularly from the top wall 26 at the end thereof remote from the end secured to the side frame member or wall 24 and disposed alongside the inner surface of the standard 16.

The standard 16 carries thereon a plurality of horizontally extending supports or shelves 28, 30, 32, 34, 36, 38 and 40 which are secured thereto by any suitable means and are arranged in superimposed parallel relation to each other. The purpose of each of these suports or shelves will appear as the description of the machine proceeds.

The outer surfaces of the main frame members are enclosed by metal sheets, such as covers 29, 31 and 33 so that all of the moving parts will be enclosed within the framework and not exposed to prevent accidental injury of an operator working with the machine. These covers will so enclose the working elements of the machine as to prevent any dirt or lubricant used in connection therewith from contacting the bakery product or dough rings being produced by the machine.

The wall 26 extends in an arcuate fashion between the side walls 24 and 26 so as to define a gear receiving chamber wherein a gear may freely rotate and yet be totally enclosed.

Dough containing or holding means takes the form of a hopper 42 having a semiconical side wall 44. The free ends of the side walls 44 are provided adjacent the narrow truncated end thereof with oppositely disposed and outwardly extending flanges 46 adapted for attachment to mating flanges extending outwardly from opposite sides of a semicylindrical member 48 supported upon the shelves 34 and 36 so as to be disposed with its longitudinal axis in a vertical plane.

A smaller semicylindrical member 50 is secured to the narrow end of the side wall 44 by a band 52 so as to depend therefrom. The member 50 is provided with oppositely disposed outwardly extending flanges 54 adapted to mate with the similar flanges 49 carried by the other mating member 48 by means of bolts 56. The flanges 46 of the hopper are secured to the flanges 49 of the member 48 by suitable means such as bolts 58. The mating semicylindrical members 48 and 50 define a circular discharge passage 60 communicating at one end with the hopper 42 and extending downwardly therefrom.

A dough moving means in the form of a worm or auger 62 is disposed within the discharge passage 60 for rotation about its longitudinal axis and along the longitudinal axis of the discharge passage so as to cause the dough 64 placed in the hopper 42 to be forced through the discharge passage 60. The auger 62 is provided with a shaft 66 extending longitudinally from its upper end 68 and lying along the longitudinal axis thereof. The shaft 66 is provided with a longitudinally extending keyway 70 opening to the outer surface thereof. A bore 72 is provided longitudinally and axially through the auger 62 and its shaft 66 opening to opposite ends thereof with the bore having an enlarged portion 74 adjacent the end of the auger remote from the end from which the shaft 66 extends and opens to the lower end thereof.

The shaft 66 is journaled in antifriction bearing 76 carried in the support or shelf 38 so as to be rotatably mounted therein, and a similar antifriction bearing 78 is carried in the shelf 40 with the shaft 66 extending upwardly therethrough. A lock collar 80 is secured on the upstanding shaft 66 adjacent its upper end to prevent the downward movement of the auger 62 through the bearings 76 and 78 since the lock collar is disposed above the bearing 78 and will rest thereupon, as shown in Figure 1.

A connecting rod 82 is slidably mounted within the bore 72 for movement longitudinally thereof and extends therethrough. At its upper end, the connecting rod has secured thereto a lock collar 84 which is urged into abutting relation with the upper surface of the lock collar 80 under the influence of a spring 86 secured at one end to the upper surface of the shelf 40 and at its other end to one arm 88 of a bell crank lever 90 mounted intermediate its ends upon an upstanding support 92 for movement in a vertical arcuate path about a horizontal axis defined by the longitudinal axis of a pin 94 extending transversely through the support 92 adjacent its upper end. The end of the arm 88 remote from the pivot point 94 is provided with an elongated closed slot 96. A pin 98 extending outwardly from the lock collar 84 is received in the slot 96 so that pivotal movement of the bell crank lever 88 can be imparted to the connecting rod 82 as the other arm 100 is caused to move in a clockwise direction, as viewed in Figure 1, under the influence of the operating rod 102 extending upwardly from a solenoid 104 mounted on the upper surface of the shelf 40 adjacent the support 92.

On the lower end of the connecting rod remote from the lock collar 84, there is formed a core 105 in the form of a piston having a diameter larger than that of the connecting rod and slidably received within the enlarged bore portion 74 and limited in its movement longitudinally thereof by the shoulder 106 formed at the juncture of the enlarged portion 74 and the bore 72. The core 105 extends longitudinally from the auger 62, as clearly shown in Figure 1.

The machine provides means for imparting rotation to the dough moving means or auger 62. This means comprises an electric motor 108 mounted on the shelf 25 and completely enclosed in the framework of the machine. The motor shaft extends into a gear box 110 also mounted on the shelf 25 and operatively connected to the gears therein. Manually operable means 112 is mounted on the outside of the gear box and operatively connected to the gears therewithin whereby the speed of the shaft 114 extending outwardly from the gear box at the end thereof remote from the motor, may have its speed of rotation varied in accordance with the desires of the operator. The shaft 114 mounts thereon a sprocket wheel 116 for rotation therewith. The sprocket wheel 116 is operatively connected to the sprocket wheel 117 by means of an endless chain 118 so as to impart rotation to the sprocket wheel 117. The sprocket wheel 117 is fixedly mounted on a horizontally extending shaft 120 adjacent one end thereof so as to impart rotation to the shaft. The shaft 120 is journaled at its end adjacent which the sprocket wheel 117 is mounted thereon in a bearing boss 122 and adjacent its other end in an antifriction bearing 124 carried in a bearing support 126 extending between the shelves 38 and 40. A similar upstanding bearing support 128 extends between the shelves 38 and 40 adjacent the sprocket wheel 28 so as to rotatably support the shaft 120 in an antifriction bearing 130 carried in the support 128.

A bevel gear 132 is fixedly mounted on the shaft 120 at its end remote from the end journaled in the bearing boss 122 and extends outwardly therefrom. The bevel gear 132 meshes with a bevel gear 134 secured on the shaft 66 by means of a key disposed in the keyway 70 and a mating keyway in the gear. It will be noted that the gear 134 is provided with a depending collar 136 which rests on the top of the bearing 76.

Thus, upon operation of the motor 108, rotation will be imparted to the shaft 66 and to the auger 62 so that the auger will be rotated within the discharge passage 60 to force the dough 64 therethrough.

The lower end of the mating semicylindrical members 48 and 50 have integrally formed therewith mating, outwardly extending flanges 138 and 140 respectively to provide means whereby a mating circular flange 142 formed at the upper end and extending outwardly from a hollow, frustro-conical shaped shell 144 by means studs carried by the flanges 138 and 140 extending through suitably formed registering openings in the flange 142 and receiving on their lower or free ends wing nuts 146. The shell 144 has a hollow interior thereof defining a compression chamber 148 into which the dough is forced by the action of the dough moving means or auger 62. The larger open end of the chamber is in communication with the discharge passage 60 and forms a continuation thereof with the narrower end thereof disposed therebelow.

The core 105 extends through the chamber 148 along the longitudinal axis thereof, which longitudinal axis is in alignment with the longitudinal axis through the discharge chamber 60.

Dough molding and extruding means in the form of a hollow tubular member 150 which is secured at its upper end to the lower smaller end of the shell 144 and extends longitudinally thereof along the longitudinal center line through the shell and discharge passage.

The core 105 extends along the longitudinal center line of the tubular member 150 and therethrough in spaced concentric relation with the ring forming chamber 152 defined by the tubular member so that the dough 64 entering the molding chamber 152 from the compression chamber 148 will be formed into a tube 154 in the annular space between the core 105 and the inner surface of the tubular member 150. As the dough is forced through the molding chamber 152, it is extruded from the lower end 156 thereof and is guided to flow laterally outwardly therefrom by a die member 158 extending laterally from the end of the core 105 remote from the connecting rod 82 and maintained in this relation, as shown in Figure 1, by a nut 160 threadingly received in the externally threaded upper end of an extension rod 162 of a lower plunger-like core 164 extending along the longitudinal center line or axis through the core 105. A rubber washer 166 is interposed between the nut and the lower surface of the die member or element 158. It will be noted that the upper end of the extension rod, which is externally threaded, is received in an internally threaded bore 168 formed in the core 105 and opening to the end thereof remote from the connecting rod 82 so that the lower core 164 is dependingly carried thereby.

As the dough 64 is extruded from the discharge end 156, it is formed into a ring-like formation about the lower end of the core 105 and continually grows in size as more of the dough is extruded through the molding chamber 152.

Cutting means in the form of a sleeve 170 which is slidably carried in surrounding relation on the tubular member 150 for movement longitudinally thereof and has its lower edge 172 beveled downwardly and inwardly to define a cutting edge.

The cutting sleeve 170 is adapted to move downwardly along the tubular member 150 toward the die element 158, while the die element is carried by the core 105 for movement therewith longitudinally of the molding and extruding means 150 and these movements are designed to take place simultaneously so that the cutting edge 172 will cooperate with the outwardly and downwardly beveled upper periphery 174 to sever the extruded dough 176 from the tube 154 and for this into a ring.

Means are provided whereby the cutting sleeve 170 may be moved longitudinally of the tubular member 150. This means comprises an arm 178 (Figure 6) having a U-shaped fork 180 formed at one end thereof with the opposite legs 182 and 184 thereof disposed on diametrically opposite sides of the sleeve 170. Each of the legs 182 and 184 are provided with inwardly projecting pins 186 and 188 respectively adjacent their free ends and in opposed relation to each other. The pins 186 and 188 are received within an annular groove 190 formed between spaced, parallel, outwardly projecting, annular rings 192 formed integrally with the sleeve 170. The arm 178 is secured within a cylindrical barrel 194, adjacent the end of the arm remote from the fork. The cylindrical barrel 194 is formed as a longitudinally extending projection of a solenoid plunger 196 of lesser diameter than the barrel and extending upwardly from the solenoid 198 mounted and extending upwardly from the shelf 30. A coil spring 200 is interposed between the top of the solenoid and the shoulder formed between the plunger 196 and barrel 194 at the juncture thereof to urge the plunger in one direction away from the solenoid 198.

Upon energization of the solenoid 198, the plunger 196 will be moved downwardly, or in a direction toward the solenoid, against the effort of the spring 200 so as to move the arm 178 and fork 180 therewith. This in turn will cause the cutting sleeve 170 to move longitudinally of the tubular member 150 toward the die element 158 due to the operative connection between the fork of the arm 178 and the cutting sleeve.

There is further provided in this machine, means whereby the extruded dough rings 176 may be moved away from the molding and extruding means after operation of the cutting means to sever the dough ring from the tube of dough 154. This means comprises a pair of oppositely disposed flop levers 202 and 204 having a concave recess 206 in their opposed, spaced ends and in mating relation to concentrically surround the cutter sleeve 170, as shown in Figures 6, 7 and 8. The other ends of the levers 202 and 204 are formed with shaft receiving barrels 208 to receive therein shafts 210 and 212 respectively and secured thereon adjacent one end thereof for movement therewith. The shafts are journaled intermediate their ends in pairs of spaced bearings 214 and 216 respectively. The bearings on each of the shafts 210 and 212 are disposed intermediate their ends.

The opposite ends of the shafts 210 and 212, remote from the levers 202 and 204 have secured thereon one barrel end 218 and 220 respectively with the other ends of the levers being connected together between a bifurcation 222 formed at the upper end of a plunger 224 of a solenoid 226 upstandingly mounted on a shelf 227. The operating shafts 210 and 212 are arranged in the same horizontal plane in parallel relation while the levers carrying the respective barrels 218 and 220 are identified at 228 and 230 respectively. The levers 228 and 230 are fixedly secured within the bifurcation 222 by any suitable means such as the rivet 232 passing transversely therethrough. The rivet 232 is received in closed slots 231 and 233 in the respective levers 228 and 230 through which the rivet 232 passes and is slidingly received. A coil spring 234 has one end thereof resting upon the top of the solenoid 226 and the other end seated against the under surface of a horizontally disposed, circular flange 236 secured on the end of the plunger 224 and upon which the bifurcation is upstandingly mounted. Thus, upon the solenoid 226 being energized, the plunger will move in a rectilinear path toward the solenoid 226 against the effort of the spring 234 and cause the levers 228 and 230 to move in parallel arcuate paths about the longitudinal axes of the respective shafts 210 and 212 to impart rotation to these shafts. As a result of the rotation imparted to the shafts 210 and 212 the flop levers 202 and 204 will be moved in arcuate paths away from each other and away from the upper end of the cutting sleeve 170 toward the cutting edge 172. In closing, the flop levers 202 and 204 move in their arcuate paths as indicated by the arrows in Figures 7 and 8, the cut dough ring 176 will be moved longitudinally away from the discharge end of the molding and extruding means and toward a receiving funnel 238 disposed concentrically about the longitudinal axis through the molding and extruding means and carried at the outer end of a bracket arm 240 formed as an extension of the shelf 30.

The size which the dough ring 176 will achieve before being cut from the molding and extruding means by the cutting means, can be selectively determined by the operator through means which contact the dough ring and also is operative to cause the solenoids 104, 198 and 226 to operate to perform the movement of the parts associated therewith, as hereinbefore described.

This latter means comprises a lever 242 pivotally mounted at its upper end about a pivot pin 244 extending transversely through and outwardly extending support bracket 246 mounted on the top of a casing, generally indicated at 245 in which the manually operable controlling mechanism determining the size of the dough ring is housed. The casing 245 is supported upon the shelf 32. Thus, the lever 242 is dependingly carried by the casing 245 for movement in a vertical arcuate path toward and away from the discharge end of the molding and extruding means 150. The lever 242 has provided at its end remote from the end pivoted at 244, a laterally extending foot 248 extending toward the discharge end of the molding and extruding means. The free end of the foot 248 is provided with an arcuate stop 250, the concave side of which is adapted to be contacted by the dough extruded from the tubular member 150 at its discharge end as it is formed into a ring.

As the dough ring 176 grows in size, the lever will be moved in its arcuate path away from the tubular member so that an electrical contact 252 carried by the lever adjacent the pivot 244 will be brought into engagement with an electrical contact 254 in the form of a metal rod slidable through the adjacent side wall 256 of the casing 245 and supported therein by an electrical insulative bushing 258 for sliding movement therethrough with the major portion of the contact rod 245 extending within the casing 245, as clearly shown in Figures 10 and 11.

A generally Z-shaped, spring metal conductor 260 has one foot 262 thereof resiliently biased into engagement with the contact rod 254 within the casing 245 and has its other foot 264 secured to one wall of the casing. A wire 248 is connected to the foot 264 and is led through an opening 270 in the wall 272 of the casing, as shown in Figure 10, and is connected at its other end into a wire 274. The wire 274 extends between the solenoids 198 and 104. A wire 276, forming an electrical conductor, is connected at one end into the contact 252 carried on the lever 242 and has its other end connected into the solenoid 198. Another wire or line 278 is connected at one end into the solenoid 198 and is spliced into the positive lead wire 280 leading from a source of electrical energy. The barrel 194 carried at the upper end of the solenoid plunger 196 has secured thereto and extending outwardly therefrom an electrical contact plate 282 and has an electrical conducting wire 284 connected thereinto at one end of the wire, with the other end of the wire 284 being spliced into the lead line 280. A similar contact plate to the contact plate 284, as indicated at 286, is carried by the standard 16 and extends outwardly therefrom below the contact plate 282 so as to be in the path of movement thereof as the solenoid 198 is energized to cause downward movement of the plunger 196 and carry with it the contact plate 282, which contact plate will engage the contact plate 286. A wire 288 is connected at one end to the contact plate 286 and at its other end to the solenoid 226. The solenoid 226 is connected by wire 289 into the negative lead line wire 290 which is connected into the source of electrical energy. Thus, the normally spaced contact plates 282 and 286 define a delay means to cause the operation of the solenoid 226 after the operation of the solenoid 198.

The lead line wire 290 is connected at its end remote from the connection to the source of electrical energy into the solenoid 104. Thus, a complete circuit is provided when the contact 252 engages the contact 254, for the operation, simultaneously of the solenoids 198 and 104, with a subsequent operation of the solenoid 226. This will enable the cutting means to sever the dough ring 176 from the dough tube at the discharge end of the molding and extruding means 150 and then have the subsequent operation of the flop levers to move the cut dough ring to be received in the larger open end of the funnel 238.

The positive lead line wire 280 is connected into a terminal 292 on the motor 108. The other terminal 294 on the motor has one end of the wire 296 connected thereto while the other end of the wire is attached to one terminal 298 of an "on-off" switch 300. A wire 302 has one end thereof connected into the other terminal 304 of the switch 300 and has its other end connected into the negative lead line 290 so that a flow of electrical current may be selectively introduced into the electric motor 108 by operation of the switch 300 to cause the motor 108 to operate and drive the dough moving means or auger 62.

A dough ring rolling and smoothing means, generally indicated at 306, is mounted on the shelf 28 immediately below the lower open end of the funnel 238 for the reception of the cut dough rings moved away from the molding and extruding means by operation of the cutting means and flop levers 202 and 204. The dough rolling and smoothing means comprises a plurality of roller support brackets, generally indicated at 308, 310, 312 and 314. These brackets are arranged in angularly spaced relation on the shelf 28 with the brackets 308 and 312 being axially aligned and the brackets 310 and 314 being axially aligned in right-angular relation to the first pair of brackets 308 and 312. Thus, each of the brackets is spaced with its horizontal center line 90° from the center line of adjacent brackets.

Each of the roller support brackets is of identical construction, and hence only the bracket 308 will be described in detail with corresponding parts of the other brackets being identified by an identical numeral.

The bracket 308 has a horizontally extending base 316 provided with a longitudinally extending slot 318 transversely therethrough for the reception of the shank of a wing bolt 320 therein. The wing bolt is to be threadingly received in a suitably formed, internally threaded opening, such as the opening 320 (Figure 14) transversely through the shelf 28. The shelf 28 has a stop pin 322 disposed adjacent each of the openings 320 therethrough for reception in the slot 318 to limit the movement of the brackets transversely and longitudinally thereof. However, the brackets, and particularly as concerns bracket 308, are movable in a rectilinear path along the upper surface of the shelf 28 and secured in a selected position of adjustment by tightening the wing bolt 320.

At its inner end 324, the bracket 308 carries a pair of spaced upstanding support plates 326 and 328. A pair of roller shafts 330 and 332 fixedly carrying thereon concavely formed rollers 334 and 336 respectively extend between the support plates 326 and 328 in parallel relation and adjacent the bottom and the top of the plates. An endless belt 338 is trained about the rollers 334 and 336 and adapted to move in a closed path perpendicular to the base 316 of the bracket.

As clearly shown in Figure 12, the brackets 308, 310, 312 and 314 are so disposed and adjusted on the shelf 28 that the inner runs of the belts form a substantially circular dough ring receiving channels 340 with the lower core 164 extending along the longitudinal center line of the channel 340 and concentrically spaced from the adjacent inner runs of the endless belts on each of the brackets.

A small electric motor 342 is mounted adjacent the bracket 310 on a motor supporting bracket 344 secured to the standard 16, as clearly shown in Figure 13.

The motor shaft 346 carries adjacent its outer end a bevel gear 348 having a collar 350 formed therewith so that the gear may be secured along the shaft 346 at a selected position so as to properly mesh with a bevel gear 352 mounted at one end of the upper shaft 332 of the bracket 310 on that portion of the shaft which projects outwardly from the upstanding support plate 326. Thus, rotation will be imparted to the upper roller shaft 332 and to the lower roller shaft 330 by frictional contact of the endless belt 338 trained about the rollers. The lower shaft 330 carries on its opposite outwardly projecting portions, bevel gears 354 and 356.

These bevel gears are secured upon the shaft by means similar to the collar and set screw arrangement on the bevel gear 348 so that they may properly mesh with mating bevel gears 356 and 360 mounted on respective ones of the lower pair roller shafts 330 of the opposed brackets 308 and 312 so as to have rotation imparted to these lower roller shafts.

A bevel gear 362 is mounted on the projecting end of the lower roller shaft remote from the projecting end upon which the gear 360 is mounted with regard to the bracket 308 so as to mesh with a mating bevel gear 364 secured upon the outwardly projecting portion of the lower roller shaft of the bracket 314 so as to impart rotation thereto and thus cause the endless belt 338 in both of the brackets 308 and 314 to move in their closed paths. Similarly, the bevel gear connection between the lower roller shafts of the brackets 314 and 312 is effected by the meshing bevel gears 366 and 368. Thus, a gear arrangement is provided whereby the endless belts 338 conforming to the concave surface of the rollers about which they are trained, are moved in their closed paths.

As the cut doughnut ring 176 passes through the funnel 238 and is received in the channel 340, the center hole through the ring will be arranged about the lower core or guide 164 and its outer periphery engaged in the moving endless belts on the respective brackets so that the dough ring will be rolled and smoothed and then discharged through a suitably formed opening 370 transversely through the shelf 28 and disposed isometrically about the longitudinal axis through the channel 340. The dough ring falling through the opening 370 will be received on an endless conveyor belt 372 to be conducted to an oven where the dough rings will be baked into their final form as "bagels."

As hereinbefore indicated, the size which the dough rings 176 may attain can be selectively predetermined by the operator through the size control means associated with the electrical contact rod 254. This size control means comprises a knob 374 fixedly secured on the outer end of a knob shaft 376 and provided with a pointer 378 cooperating with an arcuate index scale 380 having spaced indicia thereon indicating the size of the doughnut ring to be formed. The knob is disposed outwardly of the cover plate 29 and the shaft 376 extends transversely therethrough and is journaled in a bearing boss 382 formed in the wall 272 of the casing 245, as shown in Figure 10. The other end 384 of the shaft 376 is journaled in a bearing boss 386 formed on the outer surface of the wall 388 remote from and parallel to the wall 272 so that the shaft 376 extends transversely through the casing 245.

A relatively large gear wheel 390 is fixedly mounted on the shaft 376 adjacent its free end 384 remote from the end thereof carrying the knob 374 and is adapted to mesh with a smaller gear 392 mounted on a shaft extending transversely through the casing 245 and in parallel relation to and immediately below the shaft 376. A bevel gear 394 is also carried upon the same shaft as the smaller gear wheel 392 and is adapted to mesh with a bevel gear 396 of smaller diameter having a central longitudinal bore 398 therethrough provided with internal threads to have a threaded engagement upon the externally threaded portion 400 of the contact rod 254. The contact rod 254 may be moved in a rectilinear path toward and away from the contact 252 upon rotation of the operating knob 374 through the gear arrangement just described. It will be noted that the end of the contact rod 402 remote from the end adjacent the contact 252 is slidably received within the central, longitudinal bore 404 opening to opposite ends of a cylindrical bearing member 406.

Thus, as the knob 374 is moved in a clockwise direction along the arcuate scale 380, from one end thereof to the other, the heretofore described gear arrangement will cause the movement of the contact rod 254 away from the contact 252 so as to increase the spacing between their adjoining ends. As a consequence, it will require more of the dough to be extruded into the ring 176 before contact is made between the contact elements 252 and 254 so as to induce the operation of the solenoids 198 and 104 and subsequently the operation of the solenoid 226 to perform the functions hereinbefore set forth.

It will be noted that the threaded portion 400 of the contact rod 254 extends through a hole transversely through the support plate 408 extending into the interior of the casing 245 from the wall 388 and in spaced parallel relation to the wall 256. Therefore, the support plate 408 has one face thereof contacted by the end face of the gear collar nut 410 formed integrally with the bevel gear 396 so as to form a stop therefor. Thus, as the gear 396 is caused to rotate, the contact rod 254 will be caused to move longitudinally therethrough toward and away from the contact element 252.

As previously indicated, the speed at which the motor 108 will drive the auger 62 can be selectively adjusted by rotating the control knob of the speed control means, the knob being indicated at 113. The knob is provided with a pointer 410 cooperating with an arcuate scale 412 mounted on the cover plate 31 so as to indicate the speed at which the motor will have its output through the reduction gear means in the gear housing 110 varied from 75 to 200 R. P. M. in a manner well known in the reduction gear art.

A protective plate 414 having an upper beaded edge 416 extending from the hopper 42 and above the auger 62 and to the side thereof remote from the bevel gear 132. The protective plate is upstandingly carried on the free ends of the shelves 38 and 40 and projects upwardly therefrom with the free beaded edge 416 disposed at a considerable distance above the open top of the hopper 42 so as to prevent any of the dough 64 placed in the hopper from moving upwardly and outwardly of the hopper toward the operating mechanism disposed to the side of the plate 414 remote from the open top of the hopper. In connection with the motor 342 for imparting movement to the concavely formed endless belts 338 on each of the brackets of the rolling and smoothing means, it will be noted that a pair of wires or electrical conductors 418 and 420 are connected at one end to the motor through the usual terminals thereon and at their other ends to the main lead line wires 280 and 290 respectively so that the motor will receive the necessary electrical current from the source of current for its operation.

While there is shown and described the preferred embodiment of the invention, it is to be understood that the structure is susceptible to change and modification within the practicability of the invention and therefore should be limited only by the scope of the claims appended hereto.

What is claimed:

1. A machine for producing dough rings comprising a hopper containing dough, a hollow cylinder open at both ends defining a dough discharge passage in communication with said hopper at one end, an auger mounted to rotate about its longitudinal axis and arranged to extend longitudinally of said passage to force the dough from said hopper through said discharge passage, means to rotate said auger, molding and extruding means receiving the dough from said discharge passage to form the dough into a tube and extrude the dough as a ring at its discharge end, and cutting means for severing the extruded dough ring from the tube, said molding and extruding means comprising a tubular housing in communication at one end with said discharge passage, and a core disposed within said housing in concentric spaced relation thereto to define a tube molding chamber in the space between said core and said housing, said auger having a central bore longitudinally therethrough, a connecting rod freely disposed in said bore for reciprocating movement longitudinally therethrough independently of the rotation of said auger, said core carried by said connecting rod at one end thereof for movement therewith and extending longitudinally therefrom through said discharge passage and through said molding and extruding means.

2. A machine for producing dough rings comprising a hopper containing dough, a hollow cylinder open at both ends defining a dough discharge passage in communication with said hopper at one end, an auger mounted to rotate about its longitudinal axis and arranged to extend longitudinally of said passage to force the dough from said hopper through said discharge passage, means to rotate said auger, molding and extruding means receiving the dough from said discharge passage to form the dough into a tube and extrude the dough as a ring at its discharge end, and cutting means for severing the extruded dough ring from the tube, said molding and extruding means comprising a tubular housing in communication at one end with said discharge passage, and a core disposed within said housing in concentric spaced relation thereto to define a tube molding chamber in the space between said core and said housing, said auger having a central bore longitudinally therethrough, a connecting rod freely disposed in said bore for reciprocating movement longitudinally therethrough independently of the rotation of said auger, said core carried by said connecting rod at one end thereof for movement therewith and extending longitudinally therefrom through said discharge passage and through said molding and extruding means, said cutting means including a cutter sleeve surrounding said tubular housing and mounted for reciprocating movement longitudinally thereof, die means carried by said core at its end remote from said connecting rod for movement therewith and disposed outwardly of the discharge end of said tubular housing, means for reciprocating said cutter sleeve and said die means toward and away from each other to form and sever a dough ring extruded from the dough tube in said molding and extruding means.

References Cited in the file of this patent

UNITED STATES PATENTS

| | | |
|---|---|---|
| 1,552,430 | Gendler | Sept. 8, 1925 |
| 1,702,191 | Bergner | Feb. 12, 1929 |
| 1,755,921 | Gendler | Apr. 22, 1930 |
| 1,825,844 | Ainslie | Oct. 6, 1931 |
| 2,189,217 | McDonald | Feb. 6, 1940 |
| 2,263,490 | Fox | Nov. 18, 1941 |
| 2,379,956 | Ersepke | July 10, 1945 |
| 2,505,243 | Hewitt et al. | Apr. 25, 1950 |
| 2,666,398 | Gendler et al. | Jan. 19, 1954 |
| 2,676,552 | Hunter et al. | Apr. 27, 1954 |